United States Patent [19]

Oda et al.

[11] Patent Number: 4,501,829

[45] Date of Patent: Feb. 26, 1985

[54] COATING COMPOSITION

[75] Inventors: Shoji Oda, Hiroshima; Kunihiko Ehara, Osaka; Hirotoshi Umemoto, Kyoto; Shinji Nakano, Hyogo, all of Japan

[73] Assignee: Nippon Paint Co., Ltd., Osaka, Japan

[21] Appl. No.: 529,873

[22] Filed: Sep. 6, 1983

[30] Foreign Application Priority Data

Sep. 6, 1982 [JP] Japan ................. 57-155633

[51] Int. Cl.$^3$ .................. C08K 5/34; C08K 3/22
[52] U.S. Cl. .................. 523/400; 523/454; 523/457; 523/458; 523/459; 523/466; 523/468; 523/500; 523/508; 523/514; 523/515; 524/86; 524/88; 524/89; 524/90; 524/360; 524/413; 524/431; 524/432; 524/433; 524/444; 524/539
[58] Field of Search ............... 524/86, 88, 89, 90, 524/360, 413, 431, 432, 433, 444, 539; 523/400, 457, 458, 459, 468, 466, 454; 525/437

[56] References Cited

U.S. PATENT DOCUMENTS

| | | | |
|---|---|---|---|
| 3,691,258 | 9/1972 | Riemhofer et al. | 524/539 |
| 3,835,089 | 9/1974 | Fox et al. | 525/437 |
| 4,122,073 | 10/1978 | Georgoudis | 525/437 |
| 4,169,825 | 10/1979 | Yapp et al. | 523/454 |
| 4,276,405 | 6/1981 | Koleske et al. | 523/400 |

*Primary Examiner*—Lewis T. Jacobs
*Attorney, Agent, or Firm*—Wenderoth, Lind & Ponack

[57] ABSTRACT

A coating composition comprising (A) a polyester resin modified with a lactone having 6 to 8 ring carbon atoms (I) or a mixture of said lactone-modified polyester resin (I) and a non-modified polyester resin (II), the lactone content being from 5 to 40% by weight of the total polyester resin (in solid) (I) or (I+II), the number average molecular weight being 800~200 mg KOH/g and wherein the resinous acid value is 2~20 mg KOH/g, (B) a crosslinking agent, (C) a pigment and (D) optionally other resins. The composition is useful as an intercoat paint for automobile bodies.

13 Claims, No Drawings

COATING COMPOSITION

FIELD OF INVENTION

The present invention relates to a coating composition and more specifically to a coating composition having excellent chipping resistance, which is particularily useful as an intercoat paint for automobile bodies and the like.

BACKGROUND OF THE INVENTION

In a snowy area, a quantity of rock salt and/or gravel are often scattered over the roads, which, when combined with sand and stones on non-pavement roads, inevitably cause damage to the coatings of automobile bodies and causes serious concerns in the related field. That is, a coating formed by a conventional coating composition is liable to be damaged such as to expose the substrate metal by stone chipping, which becomes easily rusted, thereby resulting in an inferior appearance. In order to overcome these serious problems, there have been proposed various methods, i.e. a method of applying, between top and under coats, an intermediate coating containing ultrafine sericit particles (as Japanese Patent Pub. No. 43657/77); a method of using an inter coat comprising an acidic resin, talc and an antirust pigment (as Japanese Patent Application Kokai No. 56165/80) and a method of applying a first intercoat containing a talc and then a second intercoat containing no talc, in a wet on wet system (as Japanese Patent Publication No. 45813/78.

However, these methods are all based on the idea that when the coating is chipped, the inter coat will be peeled off, thereby absorbing said chipping impact and preventing the damage to the metal plate substrate. This chipping, however, makes for a poor film appearance and the protection performance of the coating is diminished.

Furthermore, an increase in the number of coating operations is clearly undesirable from the viewpoint of manufacturing efficiency.

In a coating system involving an electrodeposition-inter coating-top coating as used in the automobile industry or the like, one cannot but rely on hard multilayer coatings from the standpoint of generic performance, weather resistance, appearance of the coating and the like. However, when the coating is chipped, the impact strength is transfered to the steel substrate and hence the substrate is easily damaged and rusted. Therefore, at the under floor and side sill portions of automobile bodies, it is a general practice to apply a coating containing, as a main ingredient, a very soft material like a vinyl chloride sol, a rubber latex, a urethane resin and the like in a film thickness in the order of 200 to 500μ. Such coating is indeed excellent in chipping resistance because of its higher elongation properties, but has the drawback of an orange peel-like and inferior appearance an, inferior general generic performance due to deficient tensile strength and softness, and poor weather resistance. Therefore, such coatings cannot be applied over the surfaces of the outer plates of automobile bodies which extend above the side step thereof. Thus, in the coating of automobile bodies, hard and soft paints are separately applied on the upper and the lower portions of the borderline of the side step. It is needless to say, however, that even at the under floor portion, preference is given to a coating which exhibits excellent coating performance, weather resistance, and has a good appearance.

In general, it has been well known that the softer the film softness, the larger the elongation and the lesser the tensile strength of the film.

According to the inventors' studies, it has been found that if the film has a larger elongation, then the substrate damage and hence rust generation hardly occurs when the coating is chipped with stones, but there are such disadvantages that cohesion failure of the film is liable to occur because of its inferior tensile strength, thereby causing interface failure and exposure of the substrate surface. This results in the deterioration of the film appearance. The inventors have further continued the studies and have succeeded in finding a coating composition having well balanced properties with respect to each of these conflicting properties.

SUMMARY OF THE INVENTION

An object of the invention is, therefore, to provide a coating composition having considerably larger elongation and tensile strength and hence, is excellent in chip resistance. Another object of the invention is to provide a coating composition which is useful as an under floor coating and especially as an intercoat for automobile bodies.

Further objects of the invention shall be apparent to those skilled in the art from the description of the specification. These and other objects of the invention may be attained with the present coating composition comprising (A) a polyester resin modified with a lactone having 6 to 8 carbon atoms in its ring (I) or a mixture of said lactone modified polyester resin (I) and a non-modified polyester resin (II), the lactone content being from 5 to 40% by weight of the total polyester resin (solid) (I) or (I+II), the number average molecular weight being 800~4000, the hydroxyl value being 50~200 mg KOH/g and the resinous acid value being 2~20 mg KOH/g, (B) a crosslinking agent, (C) a pigment and (D) optionally other resins, said pigment being in the range of from 40 to 65% by weight of the total solid matter, and wherein the thus-formed film has such characteristics that it has a static Tg of −10° to 30° C., elongation of 7 to 80% and a tensile strength of 150 to 350 Kg/cm$^2$.

PREFERRED EMBODIMENTS OF THE INVENTION

In the present coating composition, a polyester resin is selectively used as component (A). This polyester resin consists of lactone-modified polyester resin alone or a mixture of said lactone-modified polyester resin and non-modified polyester resin, the lactone content being 5 to 40% by weight of the total polyester solid, the number average molecular weight being 800 to 4000, the hydroxyl value being 50 to 200 mg KOH/g and the resinous acid value being 2 to 20 mg KOH/g.

A polyester resin is generally obtained by the polycondensation of a polyhydric alcohol and a polycarboxylic acid. Examples of a polyhydric alcohol are ethyleneglycol, diethyleneglycol, polyethyleneglycol, propyleneglycol, dipropyleneglycol, polypropyleneglycol, neopentylglycol, 1,2-, 1,3-, 2,3-, 1,4-butanediol, 1,5-pentanediol, 1,6-hexanediol, hydrogenated bisphenol A, hydroxyalkylated bisphenol A, 1,4-cyclohexane dimethanol, 2,2-dimethyl-3-hydroxypropyl-2,2-dimethyl-3-hydroxypropionate (manufactured by BASF, trade name HPN), 2,2,4-trimethyl-1,3-pentanediol, N,N-bis(2-hydroxyethyl)dimethylhydantoin, polytetramethyleneetherglycol, polycaprolactonepolyol, glycerine, sorbitol, mannitol, trimethylol ethane, trimethylolpropane, trimethylolbutane, hexanetriol, pentaerythritol, dipentaerythritol, tris(hydroxyethyl)isocyanulate and the like; and examples of polycarboxylic acids are phthalic acid, phthalic anhydride, tetrahydrophthalic acid, tetrahydro phthalic anhydride, hexahydrophthalic acid, hexahydrophthalic anhydride, methyl tetrahydrophthalic acid, methyl tetrahydrophthalic anhydride, hymic anhydride, trimellitic acid, trimellitic anhydride, pyromellitic acid, pyromellitic anhydride, isophthalic acid, terephthalic acid, maleic acid, maleic anhydride, fumaric acid, itaconic acid, adipic acid, azelaic acid, sebacic acid, succinic acid, succinic anhydride, lactic acid, dodecenyl succinic acid, dodecenyl succinic anhydride, cyclohexane-1,4-dicarboxylic acid, endoic anhydride, head acid anhydride and the like. These alcohols and polycarboxylic acids are each used singularly or combination of more than two. For the purpose of molecular weight regulation and the like, a monohydric alcohol and a monocarboxylic acid may be used.

At the time when alicyclic polycarboxylic acid(s) is (are) used as the polycarboxylic acid component, the amount of said acid(s) should preferably be limited to less than 10% by weight of the total acid component from the standpoint of the film tensile strength or the like.

In the present invention, at least a part of said polyester resin is subjected to a lactone-modification with such lactone having 6 to 8 ring carbon atoms. Examples of such lactone compounds used in said modification are ε-caprolactone, ζ-enantolactone, η-caprylolactone and their ring substituted derivatives. If the ring carbon atoms is less than 5, such lactone is, even when used for the modification of a polyester resin, easily removed from the polymer chain at an elevated temperature and such polyester resin cannot be used for the present objects. On the carbon atoms of said lactone ring, any inert substituents such as alkyl, alkoxyl, cycloalkyl, phenyl, benzyl and the like may be present if desired. Such lactone modified polyester resin may be prepared, after forming a polyester resin in a conventional way, by adding the desired lactone compound to the polyester resin and heating the mixture, thereby effecting the ring opening reaction with a hydroxyl group of the polyester resin. At this time, a tin compound and/or organo lead or manganese compound may be preferably used as a catalyst. Examples of preferable catalyst used in the preparation of lactone-modified polyester resins are the compounds of the formula:

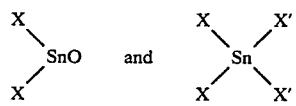

wherein X represents alkyl, aryl, aralkyl, or alkoxyl group, X' is alkyl, aryl, aralkyl, acyloxy, halogen or hydroxyl group, as, for example, tetraphenyl tin, tetraoctyl tin, diphenyl tin dilaurate, tri-n-butyl tin hydroxide, tri-n-butyl tin acetate, dimethyl tin oxide, dibutyl tin oxide, dilauryl tin oxide, di-n-butyl tin dichloride, dioctyl tin dichloride and the like, and lead acetate, manganese acetate, lead 2-ethylhexane acetate, lead salicylate, lead benzoate and the like. The lactone portion in the lactone-modified polyester resin can give, in its state combined with the polyester chain, a flexibility towards the polyester resin. Therefore, the lactone content is rather a quite important factor of the present invention, but the actual quantity in the modified polyester resin may vary with such conditions as to whether the lactone modified resin alone or a combination of this lactone-modified resin and non-modified resin is used as the polyester resin component (A).

According to the studies of the present inventors, it has been found that in either case, the lactone content should be 5 to 40% by weight of the solid matter of the polyester resin. If the lactone content is less than 5% by weight of the solid matter of polyester resin, it is difficult to obtain the present coating composition capable of forming the film with improved elongation and stiffness, and if the content exceeds the upper limit of 40% by weight, there is caused a decrease in the tensile strength and hardness of the film, thereby resulting in a the film with inferior chemical resistance and water resistance.

The present polyester resin (lactone modified polyester resin alone or combination of lactone-modified and non-modified polyester resins, hereinafter the same) should preferably have a number average molecular weight of 800~4000, a hydroxyl value of 50~200 mg KOH/g and a resinous acid value of 2~20 mg KOH/g. This is because, when the number average molecular weight is more than 4000, the resinous viscosity is undesirably increased, and hence a highly concentrated coating composition cannot be obtained and a thicker coating can hardly be obtained. If the number average molecular weight, however, is less than 800, the composition tends to display inferior plasticity and results in a brittle film having inferior water resistance.

Incidentally, the abovesaid number average molecular weight is determined by gel permeation chromatography and exchanged with polystyrene.

When the hydroxyl value of the polyester resin is less than 50, there are only limited number of crosslinking points, and it is rather difficult to obtain a stiff coating. When the hydroxyl value exceeds the upper limit of 200, there remains a number of unreacted hydroxyls in the baked coating, which is undesirable from the standpoint of the water resistance of the film.

when the acid value is less than 2, the reactivity with the crosslinking agent of the aminoplast is weakened and when it is more than 20, the remaining carboxyls in the baked film are increased, which leads to the lowering of the water resistance of the film. Therefore, in the present invention, the number average molecular weight, the hydroxyl values and the resinous acid values are defined as above for the purpose of producing the best coating composition in respect of the film performance. It is to be understood, however, that the defined characteristics of the polyester resin may be partly or wholly neglected providing but the film performance of the coating will be partly sacrificed to some extent. The extent to which the various parameters can be neglected will depend upon the intended objectives of the film. The invention shall include these cases as less preferable embodiments.

The second component of the present composition is a crosslinking agent. As the crosslinking agent, any of the members customarily used in paints may be satisfactorily used, including methoxy modified, butoxy modified aminoplasts or mixtures thereof like melamine-formaldehyde resin, urea-formaldehyde resin, thiourea-formaldehyde resin, benzoguanamine-formaldehyde resin, and acetoguanamine-formaldehyde resin; isocyanate compounds like isocyanate, polyisocyanate, blocked isocyanate and the like; phenol resin or the like. A particularly preferable crosslinking agent is an aminoplast. In this case, the weight ratio of said polyester resin to aminoplast (on a solid basis) is, in general, 80:20~55:45, and preferably 70:30~60:40.

If the said ratio exceeds the limit 80:20, then the quantity of reactive groups in the aminoplast will be too deficient to maintain the desired crosslinking density, thereby causing the decrease in water resistance and hardly obtaining the film with excellent tensile strength and toughness.

If the said ratio become less than the level of 55:45, then the quantity of reactive groups in the aminoplast will become excessively larger than those required against the hydroxyl groups of the polyester resin, thereby causing over-self condensation of the aminoplast and resulting in excessively hardened film with decreased adhesive and elongation properties. The other resins used as optional components in the present compositions include an epoxy resin. Though the epoxy resin is not essential for the present objects, the addition of this particular resin will result in a coating with toughness and far improved film performance. As the epoxy resin, any of the members customarily used in the paint industry may be satisfactorily used. For example, use can be made of Bisphenol type epoxy resins as Epicote 828,834,836,1001,1004,1007, DX-255 (all Shell Chem. products), Alardite GV-260, 6071, 6084 (Ciba Geigy's products), DER-330, 331, 337, 660, 661, 664 (Dow Chem.'s products), Epicron 800, 830, 850, 860, 1050, 4050 (Dainippon Ink.'s products); phenol novolak type epoxy resins as DEN 431, 438 (Dow Chem.'s products), polyglycol type epoxy resins as Alardite CT 508 (Ciba Geigy), DER 732, 736 (Dow Chem.'s products); and other ester type epoxy resins, linear aliphatic epoxy resins, polyol type epoxy resins, alicyclic epoxy resins, halogen-containing epoxy resins and the like. However, when added, said epoxy resin should be in the range of 5 to 20% by weight of the total amounts of polyester resin and aminoplast. This is because, at a lower level of less than 5% by weight, the effect of using the epoxy resin cannot be fully attained, whereas at a higher level over 20% by weight, the desired film properties cannot be obtained because of the presence of excess amounts of said epoxy resin.

in the present coating composition, there is compounded, besides the abovesaid resinous components, a pigment in an amount of 40 to 65% by weight, preferably 45 to 55% by weight, of the total solid. When the pigment exceeds the upper limit of 65% by weight, rust is generated in the metal substrate when the coating is chipped, and there is an appearance of failure due to the coating peeling. At the lower level of less than 40% by weight, the same problems are apt to occur, which will cause pinholes and sagging. The pigments employable in the present coating composition may be of any type customarily used as an intercoat for automobile bodies, and typical examples are inorganic pigments such as carbon black like metal oxides as, for example, titanium dioxide, magnesium oxide, zinc oxide, iron oxide and the like, non-iron metal compounds such as silicates, strontium chromate, zinc chromate, barium sulfate, inter alia ultrafine barium sulfate; and organic pigments as, for example, phthalocyanine blue, phthalocyanine green, quinacridone, flavanthrone, benzimidazolone, anthanthrone and the like. The pigments may be used alone or in a combination of more than two.

In the present coating composition, any of the conventional additives, such as antisagging agents, antisinking agents, anti-flooding agents, surface conditioners, antioxidants, light stabilizers, UV absorbers, hardeners and the like may be added as required.

Polyester resins, aminoplasts and epoxy resins are often provided in varnish form, compounded with solvent and the like, and therefore, in practice, they may be used as varnishes after calculating the content on a solid basis. At this time, the solvent may be taken as a part of said additives. Thus, in the present invention, any of the conventional additives may freely be added as an optional component.

In the present coating composition, the abovesaid components are uniformly mixed together. However, for the intended objects of producing a film of excellent chip resistance, the coating should preferably have the following properties. The first requirement concerns the static glass transition point Tg (hereinafter merely called as static Tg). This, differs from the dynamic glass transition point, and is determined, after making a curved graph of the temperature vs. the specific volume of the resin, by checking the turning point of said curve. According to the knowledge of the inventors, the static Tg of the film should preferably be in the range of $-10°\sim30°$ C., most preferably $5°\sim30°$ C. If the static Tg is higher than 30° C., there is a trend that the coating will become hard and lose elasticity, which is undesirable from the standpoint of enhancing the chip resistance and preventing rust formation, whereas if the static Tg is less than $-10°$ C., then the static Tg difference between the top coat and the under coat will be of an undesirably higher order, thereby causing cracks on the film upon the cooling and heating thereof.

Secondarily, the film elongation should preferably be in a range of 7~80%, and more preferably 10~50%. This is because, when the elongation is less than 7%, it is not possible to expect full relaxation of the chipping impact, said impact being transferred to the steel substrate, thereby causing damage of the substrate and rust generation thereon. When the elongation exceeds the upper limit of 80%, the film becomes too soft to resist peeling when it is chipped.

Lastly, the coating should preferably have a tensile strength of 150~350 $Kg/cm^2$. If the tensile strength is lower than 150 $Kg/cm^2$, there is a cohesion failure of the film occurs easily when it is chipped, thereby causing an inferior appearance because of peeling, whereas if the tensile strength is more than 350 $Kg/cm^2$, then the film become excessively hard and brittle, causing an decrease in elongation to 7% or less and resulting the decreased rust resistance of the film. Therefore, the present coating composition must have the aforesaid composition and the film characteristics to achieve the intended objects of the invention.

The invention shall be now more fully explained in the following Examples. Unless otherwise being stated, all % and parts are by weight.

MANUFACTURING OF RESINS

Manufacturing Example 1

Into a 2 liter flask equipped with a heating devise, a stirrer, a reflux condenser, water separation means, a fractionating tower and a thermometer, was placed 223 parts of trimethylolpropane, 319 parts of neopentylglycol and 188 parts of 1,6-hexanediol and heated at 80°~100° C. Stirring was started when the composition could be stirred. 707 Parts of isophthalic acid and 155 parts of adipic acid were then added and the temperature was raised to 180° C. While removing the formed water out of the system, the reaction mixture was heated to 230° C. at a constant heating speed over a period of 3 hours and thereafter, heating was continued at 230° C. for an additional 2 hours. Xylene was then added and the condensation reaction was continued, while refluxing the solvent. At the stage when the resinous acid value reached 15.0, the reaction was stopped and the mixture was allowed to cool. Thereafter, 600 parts of xylene were added to obtain an oil-free polyester resinous varnish (I), whose solid content was 70.4% the, viscosity was X-Y, the color number was 1, the varnish acid value was 10.4 mg KOH/g and the hydroxyl value was 150 mg KOH/g.

Manufacturing Example 2

Following the procedures of Manufacturing Example 1, an oil-free polyester resinous varnish (II) was prepared. The charged materials were 324 parts of trimethylolpropane, 134 parts of 1,6-hexanediol, 165 parts of 1,5-pentanediol, 356 parts of phthalic anhydride and 399 parts of isophthalic acid. After continuing the condensation reaction to the point where the resinous acid value showed 8.0, the mixture was allowed to cool and diluted with 162 parts of xylene and 648 parts of cellosolve acetate to obtain an oil-free polyester resinous varnish (II), whose solid content was 60.5%, the viscosity was Z, the color number was 1, the varnish acid value was 5.1 mg KOH/g and the hydroxyl value was 140 mg KOH/g.

Manufacturing Example 3

Into a 2 liter reaction vessel equipped with heating device, a stirrer, a rising type condenser and a thermometer, 974 parts of the resin (on solid basis) obtained in the Manufacturing Example 1 was added, and to this resin 146 parts of ε-caprolactone and 0.4 part of di-n-butyltin dilaurate and was added and the mixture was heated under a nitrogen stream to 150° C. While maintaining said temperature, sampling was carried out from time by time and measured in respect to the remaining amount of unreacted ε-caprolactone. At the stage when the reaction rate reached more than 98%, the reaction was completed and the content was allowed to cool. When the inner temperature reached 135° C., 480 parts of xylene were added to obtain a lactone-modified polyester resinous varnish (III), whose solid content was 70.2%, its viscosity was V-W, its color number was 1, its varnish acid value was 9.1 mg KOH/g and its hydroxyl value was 130 mg KOH/g.

Manufacturing Example 4

Following the procedures of Manufacturing Example 3, a lactone-modified polyester resinous varnish (IV) was prepared. The charged materials included 739 parts of the resin (on a solid basis) obtained in the Manufacturing Example 2, 222 parts of ε-caprolactone, and 0.4 part of di-n-butyltin dilaurate, and 640 parts of xylene were used as dilution thinner. The solid content of this varnish was 59.8%, the viscosity was U-V, color number was 1, the varnish acid value was 4.4 mg KOH/g, and the hydroxyl value was 108 mg KOH/g.

Manufacturing Example 5

Following the procedures of Manufacturing Example 3, a lactone-modified polyester resinous varnish (V) was obtained. The charged materials were 750 parts of the resin (on a solid basis) prepared by the Manufacturing Example 1, 450 parts of ε-caprolactone, 0.3 part of di-n-butyltin dilaurate and 513 parts of xylene as a diluting thinner. The solid content of this varnish was 70.4%, the viscosity was T>U, the color number was 2, the varnish acid value was 6.5 mg KOH/g and the hydroxyl value was 94 mg KOH/g.

Manufacturing Example 6

Following the procedures of Manufacturing Example 3, a lactone-modified polyester resinous varnish (VI) was obtained. The charged materials were 700 parts of the resin (on a solid basis) prepared by the Manufacturing Example 1, 1050 parts of ε-caprolactone, 0.3 part of di-n-butyltin dilaurate and 750 parts of xylene as a diluting thinner. The solid content of this varnish was 69.3%, the viscosity was Q-R, the color number was 1~2, the varnish acid value was 4.1 mg KOH/g and the hydroxyl value was 60 mg KOH/g.

The characteristics of these resinous varnishes are shown in the following Table 1. In that table, the resinous molecular weight was determined by gel permeation chromatography and exchanged for polystyrene. The indicated values are of a number average molecular weight thus determined.

TABLE 1

| Resinous varnish | modification % with ε-caprolactone | molecular weight of resin | varnish acid value mg KOH/g | hydroxyl value mg KOH/g | varnish solid % | varnish viscosity | color number |
|---|---|---|---|---|---|---|---|
| I | 0 | 1240 | 10.4 | 150 | 70.4 | X-Y | 1 |
| II | 0 | 2090 | 5.1 | 140 | 60.5 | Z | 1 |
| III | 13.0 | 1380 | 9.1 | 130 | 70.2 | V-W | 1 |
| IV | 23.1 | 2720 | 4.4 | 108 | 59.8 | U-V | 1 |
| V | 37.5 | 1640 | 6.5 | 94 | 70.4 | T>U | 2 |
| VI | 60.0 | 1890 | 4.1 | 60 | 69.3 | Q-R | 1~2 |

Comparative Example 1

Into a stainless steel vessel, was placed the following:

| | |
|---|---|
| Resinous varnish of Manufacturing Example 1 | 30 parts |
| Titanium R-820 (Ishihara Sangyo) | 60 parts |
| butyl cellosolve/xylene (1/1 weight ratio) | 20 parts |
| glass beads (1.5 mm φ) | 100 parts | and the mixture was stirred uniformly and dispersed well in a paint shaker for 1 hour.

Thereafter,

| | |
|---|---|
| The resinous varnish of Manufacturing Example 1 | 43 parts |
| U-van 20 SE-60 (n-butyl modified melamine-formaldehyde resin, manufactured by Mitsui Toatsu, solid 60%) | 37 parts | were added and uniformly stirred to obtain an intercoat paint. This comprises a polyester/aminoplast=70/30 (solid weight ratio) and contains a pigment in an amount of 45% of the total solid.

Comparative Example 2

Into a stainless steel vessel, was placed the following:

| | |
|---|---|
| Resinous varnish of Manufacturing Example 2 | 30 parts |
| Titanium R-820 (Ishihara Sangyo) | 60 parts |
| butyl cellosolve/xylene (1/1 weight ratio) | 20 parts |
| glass beads (1.5 mm φ) | 100 parts | and the mixture was stirred uniformly and dispersed well in a paint shaker for 1 hour.
Thereafter,

| | |
|---|---|
| The resinous varnish of Manufacturing Example 2 | 35 parts |
| U-van 20 SE-60 | 35 parts | were added and uniformly stirred to obtain an intercoat paint. This comprises a polyester/aminoplast=65/35 (solid weight ratio) and contains a pigment in an amount of 50% of the total solid.

Comparative Example 3

Into a stainless steel vessel, was placed the following:

| | |
|---|---|
| Resinous varnish of Manufacturing Example 6 | 30 parts |
| Titanium R-820 (Ishihara Sangyo) | 60 parts |
| butyl cellosolve/xylene (1/1 weight ratio) | 20 parts |
| glass beads (1.5 mm φ) | 100 parts | and the mixture was stirred uniformly and dispersed well in a paint shaker for 1 hour.
Thereafter,

| | |
|---|---|
| The resinous varnish of Manufacturing Example 6 | 30 parts |
| U-van 20 SE-60 | 30 parts | were added and uniformly stirred to obtain an intercoat paint. This comprises a polyester/aminoplast=70/30 (solid weight ratio) and contains a pigment in an amount of 50% of the total solid.

Example 1

Into a stainless steel vessel, was placed the following:

| | |
|---|---|
| Resinous varnish of Manufacturing Example 3 | 30 parts |
| Titanium R-820 (Ishihara Sangyo) | 60 parts |
| butyl cellosolve/xylene (1/1 weight ratio) | 20 parts |
| glass beads (1.5 mm φ) | 100 parts | and the mixture was stirred uniformly and dispersed well in a paint shaker for 1 hour.
Thereafter,

| | |
|---|---|
| The resinous varnish of Manufacturing Example 3 | 43 parts |
| U-van 20 SE-60 | 37 parts | were added and uniformly stirred to obtain an intercoat paint. This comprises a polyester/aminoplast=70/30 (solid weight ratio) and contains a pigment in an amount of 45% of the total solid.

Example 2

Into a stainless steel vessel, was placed the following:

| | |
|---|---|
| Resinous varnish of Manufacturing Example 4 | 30 parts |
| Titanium R-820 (Ishihara Sangyo) | 60 parts |
| butyl cellosolve/xylene (1/1 weight ratio) | 20 parts |
| glass beads (1.5 mm φ) | 100 parts | and the mixture was stirred uniformly and dispersed well in a paint shaker for 1 hour.
Thereafter,

| | |
|---|---|
| The resinous varnish of Manufacturing Example 4 | 35 parts |
| Super Beckamine G-821-60 (isobutyl modified melamine-formaldehyde resin, manufactured by Japan Reichhold, solid 60%) | 35 parts |
| Modaflow (Monsanto Chemical) | 0.3 part | were added and uniformly stirred to obtain an intercoat paint. This comprises a polyester/aminoplast=65/35 (solid weight ratio) and contains a pigment in an amount of 50% of the total solid.

Example 3

Into a stainless steel vessel, was placed the following:

| | |
|---|---|
| Resinous varnish of Manufacturing Example 5 | 30 parts |
| Titanium R-820 (Ishihara Sangyo) | 60 parts |
| butyl cellosolve/xylene (1/1 weight ratio) | 20 parts |
| glass beads (1.5 mm φ) | 100 parts | and the mixture was stirred uniformly and dispersed well in a paint shaker for 1 hour.
Thereafter,

| | |
|---|---|
| The resinous varnish of Manufacturing Example 5 | 7 parts |
| Super Beckamine G-821-60 | 23 parts |
| Aditol XL-480 (Hoechst) | 0.5 part | were added and uniformly stirred to obtain an intercoat paint. This comprises a polyester/aminoplast=65/35 (solid weight ratio) and contains a pigment in an amount of 60% of the total solid.

Example 4

Into a stainless steel vessel, was placed the following:

| | |
|---|---|
| Resinous varnish of Manufacturing Example 2 | 30 parts |
| Titanium R-820 (Ishihara Sangyo) | 59 parts |
| Mitsubishi Carbon MA-100 (Mitsubishi Kasei) | 1 part |
| butyl cellosolve/xylene (1/1 weight ratio) | 20 parts |

| | |
|---|---|
| glass beads (1.5 mm φ) | 100 parts | and the mixture was stirred uniformly and dispersed well in a paint shaker for 1 hour.
Thereafter,

| | |
|---|---|
| The resinous varnish of Manufacturing Example 2 | 2.5 parts |
| Resinous varnish of Manufacturing Example 6 | 27.9 parts |
| Super Beckamine G-821-60 | 35 parts | were added and uniformly stirred to obtain an intercoat paint. This comprises a polyester/aminoplast=65/35 (solid weight ratio) and contains a pigment in an amount of 50% of the total solid.

Comparative Example 4

Into a stainless steel vessel, was placed the following:

| | |
|---|---|
| Resinous varnish of Manufacturing Example 3 | 25.7 parts |
| Titanium R-820 (Ishihara Sangyo) | 60 parts |
| butyl cellosolve/xylene (1/1 weight ratio) | 20 parts |
| glass beads (1.5 mm φ) | 100 parts | and the mixture was stirred uniformly and dispersed well in a paint shaker for 1 hour.
Thereafter,

| | |
|---|---|
| Super Beckamine G-821-60 | 12.9 parts | was added and uniformly stirred to obtain an inter coat paint. This comprises a polyester/aminoplast=70/30 (solid weight ratio) and contains a pigment in an amount of 70% of the total solid.

Example 5

Into a stainless steel vessel, was placed the following:

| | |
|---|---|
| Resinous varnish of Manufacturing Example 5 | 30.9 parts |
| Titanium R-820 (Ishihara Sangyo) | 51 parts |
| ASP-200 (aluminium silicate) | 2 parts |
| BF-10 (precipitated barium fine particles manufactured by Sakai Kagaku K.K.) | 7 parts |
| butyl celloslove/xylene (1/1 weight ratio) | 20 parts |
| glass beads (1.5 mm φ) | 100 parts | and the mixture was stirred uniformly and dispersed well in a paint shaker for 1 hour.
Thereafter,

| | |
|---|---|
| The resinous varnish of Manufacturing Example 1 | 20.6 parts |
| Super Beckamine G-821-60 | 40 parts | were added and uniformly stirred to obtain an intercoat paint. This comprises a polyester/aminoplast=60/40 (solid weight ratio) and contains a pigment in an amount of 50% of the total solid.

Comparative Example 5

Into a stainless steel vessel, was placed the following:

| | |
|---|---|
| Resinous varnish of Manufacturing Example 3 | 30 parts |
| Titanium R-820 (Ishihara Sangyo) | 60 parts |
| butyl cellosolve/xylene (1/1 weight ratio) | 20 parts |
| glass beads (1.5 mm φ) | 100 parts | and the mixture was stirred uniformly and dispersed well in a paint shaker for 1 hour.
Thereafter,

| | |
|---|---|
| Resinous varnish of Manufacturing Example 3 | 13 parts |
| Super Beckamine G-821-60 | 50 parts | were added and uniformly stirred to obtain an intercoat paint. This comprises a polyester/aminoplast=50/50 (solid weight ratio) and contains a pigment in an amount of 50% of the total solid.

Example 6

Into a stainless steel vessel, was placed the following:

| | |
|---|---|
| Resinous varnish of Manufacturing Example 4 | 40 parts |
| Titanium R-820 (Ishihara Sangyo) | 56.4 parts |
| Mitsubishi Carbon MA-100 | 0.3 part |
| Tenyo Red Iron Oxide 501 SP-N (Tone Sangyo K.K.) | 2.9 parts |
| Bentone #38 (antisagging agent, manufactured by National Co.) | 0.4 part |
| butyl cellosolve/xylene (1/1 weight ratio) | 20 parts |
| glass beads (1.5 mm φ) | 100 parts | and the mixture was stirred uniformly and dispersed well in a paint shaker for 1 hour.
Thereafter,

| | |
|---|---|
| The resinous varnish of Manufacturing Example 4 | 19 parts |
| U-van 20 SE-60 | 31.8 parts |
| Epicote #1001 50% solution (manufact. by Shell Petrochem. Co.) | 11 parts |
| Disperlon KS-273N (Kusumoto Kasei) | 0.2 part | were added and uniformly stirred to obtain an intercoat paint. This comprises a polyester/aminoplast/epoxy resin=65/35/10 (solid weight ratio) and contains a pigment in an amount of 50% of the total solid.

Example 7

Into a stainless steel vessel, was placed the following:

| | |
|---|---|
| Resinous varnish of Manufacturing Example 3 | 40 parts |
| Titanium R-820 (Ishihara Sangyo) | 53 parts |
| Fastgen blue NK (blue pigment, manufactured by Dainippon Ink Co.) | 7 parts |
| Organite A (organic benonite, manufactured by Hojun Yoko) | 1 part |
| butyl cellosolve/xylene (1/1 weight ratio) | 20 parts |
| glass beads (1.5 mm φ) | 100 parts | and the mixture was stirred uniformly and dispersed well in paint shaker for 1 hour.
Thereafter,

| | |
|---|---|
| The resinous varnish of Manufacturing Example 3 | 9.4 parts |
| Super Beckamine G-821-60 | 20 parts |
| MF-521 varnish (guanamine resin, manufact. | 11 parts |

| | | |
|---|---|---|
| by Nippon Paint Co., solid 60%) Modaflow | | 0.3 part |
| Seesorb #103 (UV absorber, manufactured by Shiraishi Calcium Co.) | | 1 part |
| Irganox 1010 (antioxidant, manufactured by Ciba-Geigy) | | 1 part | were added and uniformly stirred to obtain an intercoat paint. This comprises polyester/aminoplast=65/35 (solid weight ratio) and contains a pigment in an amount of 53% of the total solid. The paint compositions of Comparative Examples 1~5 and of Examples 1~7 each was diluted with xylene/butyl acetate (7/3 weight ratio) to adjust the viscosity at 23 seconds/No. 4 Ford Cup (20° C.). Onto a SPC-1 dull steel plate (100×150×0.8 mm) previously treated with zinc phosphate and subjected to a cationic electrodeposition (20μ), was applied the abovesaid composition and baked at 140° C. for 30 minutes. The dried coating has a thickness of 40μ. Thereafter, an alkyd resin series top coat (Orga G-25 white, manufactured by Nippon Paint Co. Ltd.) was applied so as to give 35~40μ dry thickness and baked at 140° C. for 30 minutes. The test results with these specimens are shown in Table 2.

Note:

(1), (2) The intercoat was applied on polypropylene plates (dry thickness 40μ) and baked at 140° C. for 30 minutes. The intercoat was then subjected to a peeling test, and the elongation and tensile strength were determined by using a tensilometer (20° C., tension speed 33% modulus)

(3) The abovesaid test specimen (100×150×0.8 mm) was held on a Q panel gravelometer. After repeatedly shooting at these specimens three times each with 200 g of crushed stones (No. 7) under 1.5 Kg/cm² air pressure, the specimen was salt-sprayed and the formed rust number was calculated after standing for 120 hours.

(4) Before subjecting to the salt-spraying test in the preceding para. (3), the number of peeled portions having more than 1 mm diameter was counted.

(5) Visual observation was carried out. Evaluation standards are as follows: O . . . no change; Δ . . . gloss down; and X . . . gloss down, orange peel.

TABLE 2

| Example | Ex. 1 | Ex. 2 | Ex. 3 | Comp. 1 | Comp. 2 | Comp. 3 | Ex. 4 | Comp. 4 | Ex. 5 | Comp. 5 | Ex. 6 | Ex. 7 |
|---|---|---|---|---|---|---|---|---|---|---|---|---|
| resinous varnish | III | IV | V | I | II | VI | II VI | III | V I | III | IV | III |
| lactone content % | 13.0 | 23.1 | 37.5 | 0 | 0 | 60.0 | 30.0 | 13.0 | 23.0 | 13.0 | 23.1 | 13.0 |
| polyester/ | 70 | 65 | 65 | 70 | 65 | 70 | 65 | 70 | 60 | 50 | 65 | 65 |
| melamine | 30 | 35 | 35 | 30 | 35 | 30 | 35 | 30 | 40 | 50 | 35 | 35 |
| pigment content % | 45 | 50 | 60 | 45 | 50 | 50 | 50 | 70 | 50 | 50 | 50 | 53 |
| film properties | | | | | | | | | | | | |
| Tg | 15 | 17 | 21 | 35 | 40 | −15 | 13 | 37 | 24 | 37 | 15 | 20 |
| elongation % (Note 1) | 30 | 25 | 26 | 3 | 1 | 120 | 35 | 1 | 15 | 3 | 28 | 15 |
| tensile strength Kg/cm² (Note 2) | 250 | 240 | 260 | 300 | 350 | 140 | 230 | 330 | 260 | 330 | 220 | 280 |
| performance | | | | | | | | | | | | |
| rust number (Note 3) | 5 | 3 | 3 | 30 | 35 | 10 | 3 | 20 | 3 | 32 | 3 | 3 |
| peeled number having diam. of more than 1 mm (Note 4) | 3 | 4 | 4 | 3 | 2 | 20 | 3 | 18 | 2 | 2 | 4 | 4 |
| finishing appearance (Note 5) | O | O | O | O | O | X | O | Δ | O | O | O | O |

What is claimed is:

1. A coating composition comprising
   (A) a polyester resin modified with a lactone having 6 to 8 ring carbon atoms (I) or a mixture of said lactone-modified polyester resin (I) and a non-modified polyester resin (II), the lactone content being from 5 to 40% by weight of the total polyester resin solid content of (I) or (I+II), said polyester resin having an average number molecular weight of 800~4000, a hydroxyl value of 50~200 mg KOH/g and a resinous acid value of 2~20 mg KOH/g,
   (B) a crosslinking agent,
   (C) a pigment and
   (D) 0~20% by weight of the total amounts of polyester resin and crosslinking agent of epoxy resins(s), said pigment amounting to 40~60% by weight of the total solid matter, and wherein the film formed has a static Tg of −10°~30° C., an elongation of 7~80% and a tensile strength of 150~350 Kg/cm².

2. A composition according to claim 1, wherein the crosslinking agent is an aminoplast.

3. A composition according to claim 2, wherein the weight ratio of aminoplast to polyester resin, in terms of solid weight ratio, is 20:80~45:55.

4. A composition according to claim 1, wherein the resin (I) is an ε-caprolactone modified polyester resin.

5. A composition according to any one of claims 1 to 3, wherein the polyester resin is a mixture of ε-caprolactone modified polyester resin and oil-free polyester resin.

6. A composition according to any one of claims 1 to 4, wherein the lactone amount is 10~30% by weight of the solid content of the polyester resin.

7. A composition according to claim 2 or claim 3, wherein the aminoplast is melamine-formaldehyde resin.

8. A composition according to claim 2 or claim 3, wherein the solid weight ratio of polyester resin to aminoplast is 70:30~60:40.

9. A composition according to claim 1, wherein the pigment is selected from inorganic pigments consisting of carbon black, titanium dioxide, magnesium oxide, zinc oxide, iron oxide, aluminium silicate, strontium chromate, zinc chromate, and barium sulfate, including ultrafine barium sulfate, and organic pigments consisting of phthalocyanine blue, phthalocyanine green, quinacridone, flavanthrone, benzimidazolone, and anthanthrone.

10. A composition according to claim 1, wherein the pigment is included in an amount of 45~55% by weight of the total solid content.

11. A composition according to claim 1, wherein the static Tg is 5°~30° C.

12. A composition according to claim 1, wherein the elongation is 10~50%.

13. A composition according to claim 1, wherein the tensile strength is 200~300 Kg/cm$^2$.

* * * * *